Sept. 13, 1927.
F. BECKER, JR
1,642,323
INCUBATOR EGG TRAY
Filed Jan. 27, 1927
2 Sheets-Sheet 1
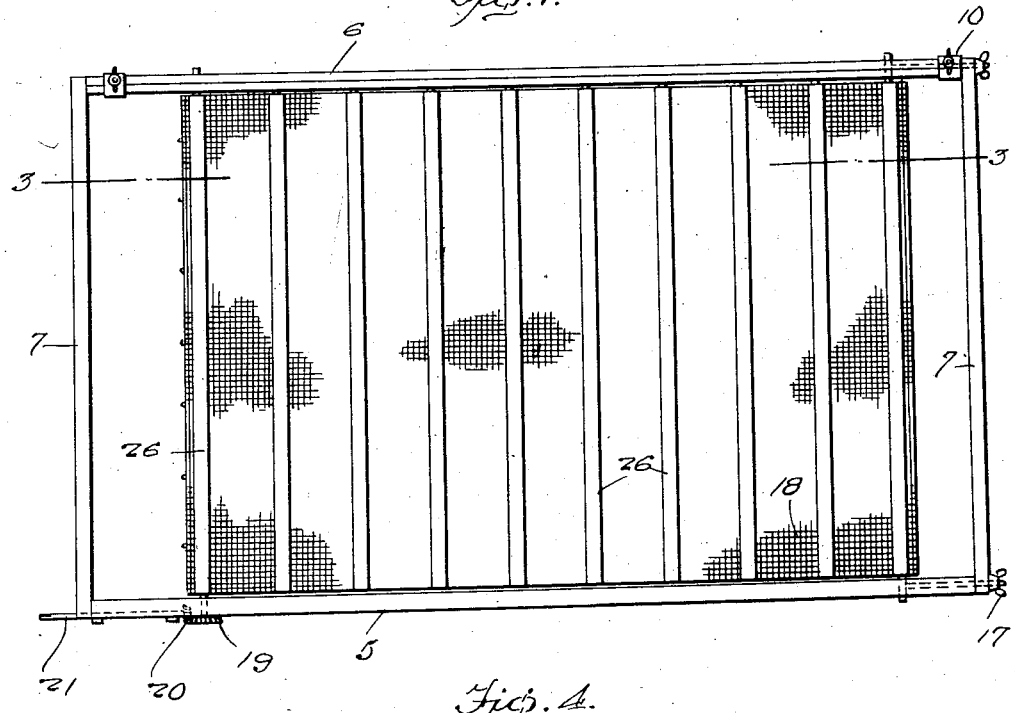
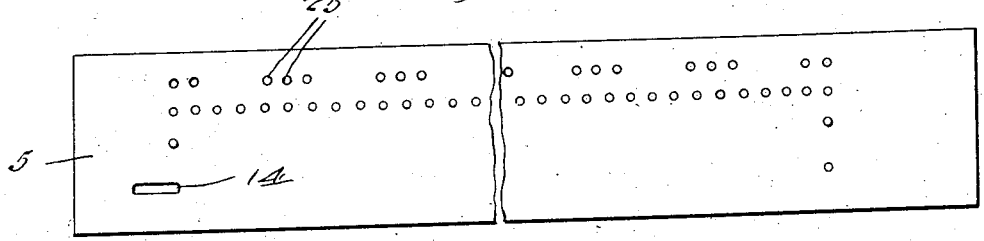
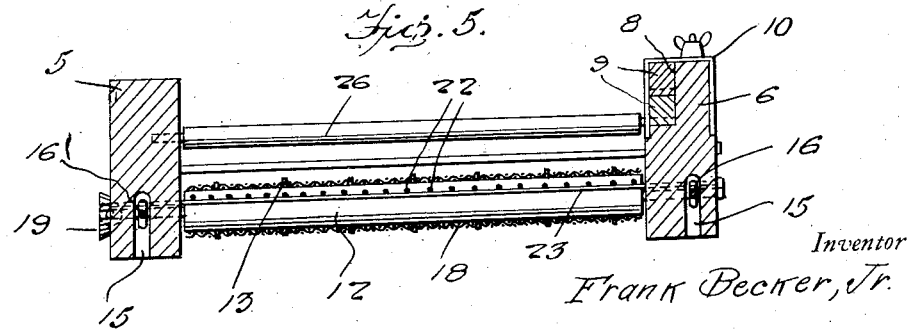
Inventor
Frank Becker, Jr.
By Clarence A. O'Brien
Attorney Sept. 13, 1927.
F. BECKER, JR
1,642,323
INCUBATOR EGG TRAY
Filed Jan. 27, 1927
2 Sheets-Sheet 2
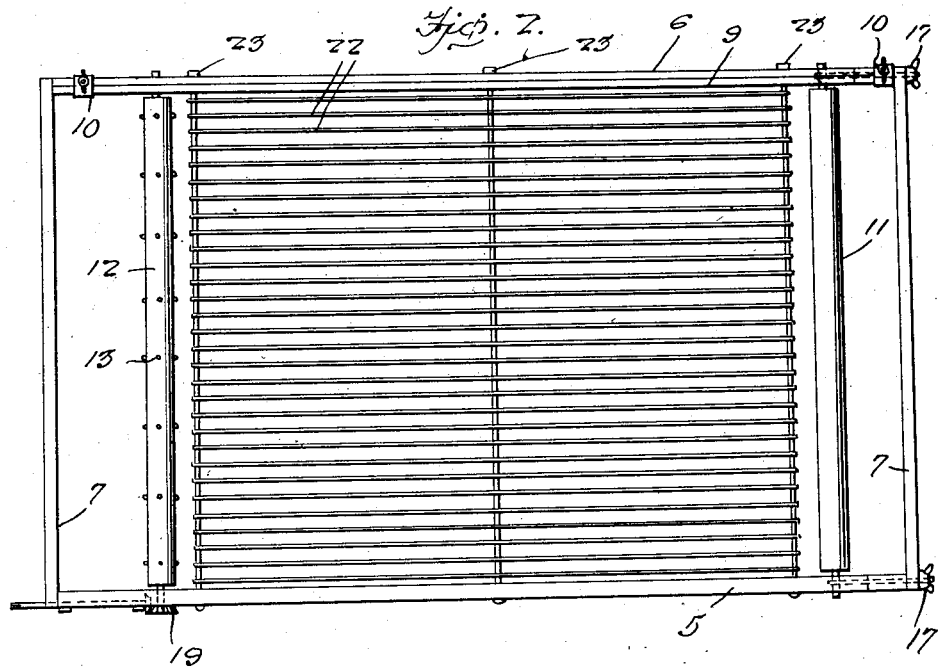
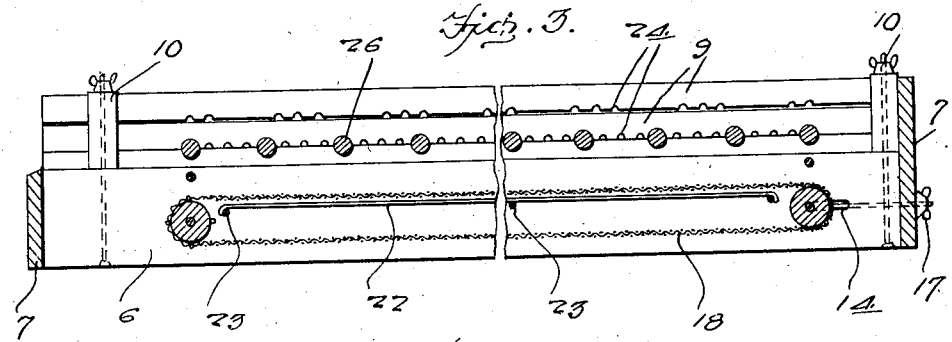
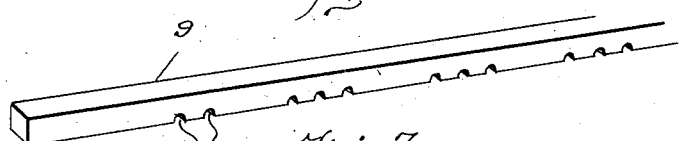
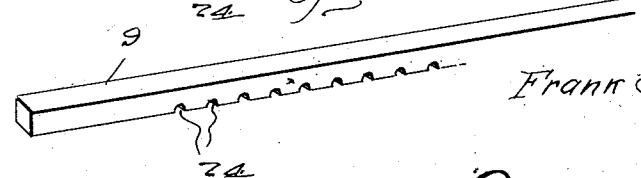
Inventor,
Frank Becker, Jr.
By Clarence A. O'Brien
Attorney Patented Sept. 13, 1927.

1,642,323

UNITED STATES PATENT OFFICE.

FRANK BECKER, JR., OF MOUNT CARROLL, ILLINOIS.

INCUBATOR EGG TRAY.

Application filed January 27, 1927. Serial No. 163,989.

This invention relates to new and useful improvements in egg trays for incubators and has for its primary object to provide a tray of this character wherein the eggs disposed thereon may be simultaneously turned through the operation of a single member, and this without any liability of crushing the eggs or throwing the same from the tray.

A further and important object is to provide an incubator egg tray wherein rows of eggs may be supported therein and wherein the device may be adjusted for supporting eggs of different sizes.

The invention further aims to provide such a tray that is extremely simple of construction, inexpensive of manufacture and one that is well adapted for all the purposes intended.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a top plan view of my improved egg tray.

Figure 2 is a similar view, the egg spacing bars and endless belt however being removed.

Figure 3 is a longitudinal section taken substantially upon the line 3—3 of Figure 1.

Figure 4 is an inner elevation of one of the side walls of the tray.

Figure 5 is a transverse section through the tray, and

Figures 6 and 7 are fragmentary perspectives of a pair of stationary bar members employed in conjunction with the present invention.

Now having particular reference to the drawings my improved tray is of substantially rectangular configuration and embodies a pair of side boards 5 and 6 which are secured together at their respective ends by the boards 7—7. As clearly disclosed in Figures 3 and 5 the inner face of the side board 6 is longitudinally channeled at its upper edge as at 8 for the purpose of supporting a pair of superposed bars 9—9 therein, which bars are secured to the side board 6 by means of a pair of U-shaped clamps 10—10 arranged adjacent the end boards 7—7 as in Figures 1, 2 and 3. The purpose of these bars will be hereinafter more fully described.

Rotatably mounted between the side boards 5 and 6 slightly inwardly of the end boards 7—7 is a pair of rollers 11 and 12, one of which is provided with spurs 13, see Figure 2. The ends of the roller 11 are mounted within longitudinal slots 14 in the side walls 5 and 6 while extending through the side walls at the end adjacent this roller are channels 15—15, Figure 5, and arranged therein are elongated eye-bolts 16—16, the eyed ends of which are attached to the ends of the roller 11, while threaded upon the ends thereof are wing nuts 17—17, said eye bolts and wing nuts being for the purpose of providing means for adjusting the roller 11.

Trained over the two rollers 11 and 12 is an endless wire mesh screen belt 18 and in order that this belt may be moved longitudinally around the rollers, one end of the roller 12 is equipped with a beveled gear 19 in mesh with which is a small bevel gear 20 upon the inner end of a short horizontal shaft 21 that terminates at its opposite end slightly beyond the adjacent end wall 7 and at this end the same is squared in order to receive a wrench or other suitable tool to facilitate the rotation of said shaft.

For supporting the upper run of the endless belt 18 when the eggs are arranged thereon, there is provided a wire bar frame 22 suitably supported at its ends and at its center by cross bars 23, the ends of which are arranged within suitable openings in the tray side boards 5 and 6.

The lower edges of the previously mentioned bars 9—9 are formed with predetermined spaced cross notches 24, those of the upper bar being preferably arranged in spaced series as clearly indicated in Figure 6. The inner face of the side wall 5 is provided with sockets corresponding in number and position to the number and position of the notches 24 in the bars 9—9, see Figure 4. Arranged within the notches 24 of either the upper or lower bar 9—9 as well as in the registering openings 25 in said side board 5 are the pintles of cross rollers 26, it being obvious that these rollers are arranged below the lower bar 9 when small hen eggs are to be supported within the tray, whereas when larger eggs are to be disposed thereon, these bars are arranged within the notches 24 of the uppermost bar 9 and the corresponding sockets in the inner face of the side board 5. It will of course be apparent that these rollers are for the purpose of preventing the longitudinal movement of the eggs on the endless belt 18 when the same is actuated for turning the eggs.

In view of the foregoing description when considered in conjunction with the accompanying drawings, it will at once be apparent that I have provided a highly novel, simple and efficient incubator egg tray that is well adapted for all the purposes heretofore designated, and even though I have herein shown and described the invention as consisting of certain detail structural elements it is nevertheless to be understood that some changes may be made therein without effecting the spirit and scope of the appended claims.

Having thus described the invention, what I claim is:—

1. In an egg tray of the character described, a frame consisting of a pair of side boards and end boards, one of said side boards being provided with a longitudinal channel at its inner surface and upper edge, a pair of bars constructed for superposed arrangement within said channel, said bars being formed at their lower edges with notches, while the inner face of the other board is provided with transversely aligned sockets with the notches of the bars, means for removably securing the bars in the channel, an endless belt arranged around spaced rollers between the sideboards, means for moving said belt, and egg spacing bars adapted for arrangement at their inner ends beneath the notches of the upper or lower bar carried by one of said side boards and within the sockets at the inner face of the other board respectively.

2. In an egg tray of the character described, a frame consisting of a pair of side boards and end boards between which is movably arranged an endless egg supporting belt, one of said side boards being provided with a longitudinal channel at its inner surface above the belt, a pair of bars constructed for superposed arrangement within said channel, said bars being formed in their lower edges with notches, the inner face of the opposite board being provided with sockets in transverse alignment with the notches of the bars, and egg spacing rollers constructed for disposition above the endless belt and within the notches of either bar and registering openings within said side board respectively.

In testimony whereof I affix my signature.

FRANK BECKER, Jr.